United States Patent
Arnold et al.

(10) Patent No.: US 9,354,140 B2
(45) Date of Patent: *May 31, 2016

(54) METHOD FOR DETERMINING CHARACTERISTICS OF AN AUTOMATIC TRANSMISSION

(75) Inventors: Jörg Arnold, Immenstaad (DE); Thilo Schmidt, Meckenbeuren (DE); Valentine Herbeth, Friedrichshafen (DE); Klaus Steinhauser, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 1081 days.

This patent is subject to a terminal disclaimer.

(21) Appl. No.: 13/440,178

(22) Filed: Apr. 5, 2012

(65) Prior Publication Data

US 2012/0278040 A1  Nov. 1, 2012

(30) Foreign Application Priority Data

Apr. 26, 2011  (DE) .......................... 10 2011 017 516

(51) Int. Cl.
| | | |
|---|---|---|
| *G01M 13/00* | (2006.01) | |
| *G01M 13/02* | (2006.01) | |
| *F16H 59/46* | (2006.01) | |
| *F16H 61/06* | (2006.01) | |
| *F16H 59/38* | (2006.01) | |

(52) U.S. Cl.
CPC .............. *G01M 13/022* (2013.01); *F16H 59/46* (2013.01); *F16H 61/061* (2013.01); *F16H 2059/385* (2013.01); *F16H 2059/467* (2013.01); *F16H 2342/04* (2013.01); *F16H 2342/044* (2013.01)

(58) Field of Classification Search
CPC .... G01M 13/022; F16H 59/46; F16H 61/061; F16H 2342/044; F16H 2059/467; F16H 2342/04; F16H 2059/385
See application file for complete search history.

(56) References Cited

U.S. PATENT DOCUMENTS

| | | | | |
|---|---|---|---|---|
| 5,527,233 | A | * | 6/1996 | Tabata et al. .................... 477/62 |
| 5,737,979 | A | * | 4/1998 | McKenzie et al. ............ 74/731.1 |
| 5,816,979 | A | * | 10/1998 | Shiiba et al. .................. 477/176 |
| 6,155,948 | A | | 12/2000 | Gierer |
| 8,066,492 | B2 | * | 11/2011 | Rogner ............................ 417/17 |
| 9,002,598 | B2 | * | 4/2015 | Schmidt et al. ................. 701/53 |

FOREIGN PATENT DOCUMENTS

DE  196 43 305 A1  4/1998

* cited by examiner

*Primary Examiner* — Mischita Henson
(74) *Attorney, Agent, or Firm* — Davis & Bujold PLLC; Michael J. Bujold (57) ABSTRACT

A method of determining a fill current value of a converter lock-up clutch of an automatic transmission. The automatic transmission comprises a hydrodynamic converter, at which a speed ratio arises, and an output shaft. In a control sequence with the output shaft being stationary, the speed ratio is influenced by changing the control current, and the fill current value is determined from the progression of the speed ratio arising, during the control sequence, in conjunction with the progression of the control current.

13 Claims, 5 Drawing Sheets

METHOD FOR DETERMINING CHARACTERISTICS OF AN AUTOMATIC TRANSMISSION

This application claims priority from German patent application serial no. 10 2011 017 516.4 filed Apr. 26, 2011.

FIELD OF THE INVENTION

The invention relates to a method for determining characteristics of an electrohydraulically controlled automatic transmission.

BACKGROUND OF THE INVENTION

For representing the transmission ratios, automatic transmissions for motor vehicles comprise several shift elements, which can, for example, transfer torque with hydraulic pressure. With an amount of the pressure, which is also known as the clutch pressure, the halves of the shift elements are pressed against each other with an increasing force if the shift element is disengaged in a pressureless state. Due to this, the torque that can be transferred by the frictionally engaging shift element increases, or the shift element transitions from a disengaged state into the state of torque transfer subject to slip, that is, with dynamic friction. The capability to transfer torque is designated in the following as the transfer capability. An increasing transfer capability is therefore understood to be an increase of the torque that can be transferred by the shift element. If the pressure acting on the shift element increases further, the dynamic frictional torque increases and with it the transferable torque.

This applies analogously to shift elements which are actuated by a different acting energy, for instance, frictionally engaging shift elements that are engaged electromechanically.

This is also the case with frictionally engaging shift elements that are engaged without pressure, for instance using the effects of spring force. When the frictionally engaging shift element is disengaged due to pressure, this pressure is reduced for engaging the shift element, and then starting from a specific pressure, the spring force moves the halves of the shift element against each other. The transfer capability starts analogously to the case of a shift element that is disengaged when not under pressure.

Automatic transmissions typically comprise a hydrodynamic startup element, for instance a hydrodynamic torque converter that is disposed between the drive motor and a transmission. The torque converter, in addition to a smooth startup procedure, advantageously creates an increased torque during startup of the motor vehicle. A hydrodynamic clutch that exclusively guarantees a smooth startup procedure is used less often in a motor vehicle. Both hydrodynamic startup elements comprise a drive-side pump impeller that is connected in a rotationally fixed manner to the drive motor, and an output-side turbine rotor that is a coupled in a rotationally fixed manner to a transmission input shaft, for example. The driven pump impeller transfers momentum to an operating medium, generally oil, which is further transferred to the output-side turbine rotor. Common to both startup elements is the slip, or the speed difference between the pump impeller and the turbine rotor, which cannot be coupled together in a rotationally fixed manner, because torque transfer occurs exclusively by means of a hydrodynamic momentum exchange. During the startup procedure, in which a drive motor rotating at a specific rotational speed, is to be coupled via a stationary transmission, or drive train, to the wheels of the vehicle, without torque impulses to the greatest extent possible, the slip is necessary to perform the coupling function. After the startup procedure, however, slip is undesirable because this represents an undesired loss of power, and disadvantageously lowers the efficiency of the drive. For this reason, a clutch element, which is also designated as a converter lock-up clutch, is disposed between the pump impeller and the turbine wheel. By engaging the converter lock-up clutch, it is possible to connect the pump impeller and the turbine rotor together in a rotationally fixed manner, and thus to increase the efficiency of the drive train.

To guarantee a steady increase of the transfer capability of a frictionally engaging shift element, the respective pressures are increased in a defined ramp-like progression. The pressure is set using an electronic transmission control unit (EGS) that issues an electrical current as a control variable, and thereby controls an electrohydraulic gearshift device (HSG), which thereupon sets a specific pressure, depending on the value of the current, by means of an electrical pressure regulator (EDS). It should be noted that the current-pressure correlation can be different for each pressure regulator due to the manufacturing tolerances of the pressure regulator.

In order to be able to reproducibly set the desired pressure ramp it is necessary to have precise knowledge of the correlation of current which controls the EDS, and pressure generated by the EDS.

The value of the current required for generating a specific clutch pressure can be determined from a table stored in the EGS, or calculated from the desired clutch pressure using a mathematical function. The mathematical function is a polynomial, for example. Specific characteristic values, known also as compensation data, must be known in order to define the polynomial, or the table; for example, a fill current is issued by the EGS, and supplied to the electrical pressure regulator in the hydraulic gearshift device, which then generates a fill pressure in the hydraulic system or in the shift elements. The fill pressure is attained specifically when the shift element, for example a hydraulic clutch or brake, is filled to the extent that a specific pressure has built up, and the friction surfaces of the shift element have approached each other to the extent that there is dynamic friction between them, and thus torque begins to transfer.

The fill pressure, which can differ for each shift element within an automatic transmission depending on the geometric shape, is therefore assigned a specific value of the fill current. In this context, the experimentally determined fill pressure is identical for all shift elements of the same shape, even if these elements are disposed in different transmissions of the same type.

Transmission concepts are known that have a mechatronic. A mechatronic is a permanently installed assembly that substantially comprises an HSG and an EGS. It is possible to compensate for tolerances in the current-pressure correlation of the electrical pressure regulators, for example, by means of compensation data handling, and thereby to be able to use inexpensive pressure regulators for high shift quality of new vehicles.

In contrast, in the case of separate HSG and EGS components, such compensation data handling is not possible in the event of a subsequent exchange of one or both components in the field.

A method for determining characteristic values of an automatic transmission is known from the document DE19643305 A1. For this, an automatic transmission on a final test bench is shifted into the individual transmission ratio steps, where an input and output transmission speed, as well as an input and output transmission torque are measured.

Characteristic values of the automatic transmission such as fill time, fill pressure, reaction time or friction value of the disks are determined from these measured values for the clutch to be engaged during shifting. These characteristic values are then stored in a memory so that an electronic transmission control device corrects the pressure level and the time of a rapid filling pressure, fill pressure and the pressure level of a shift pressure based on these characteristic values. Using this method, the fill pressure, for example, is determined in that, with the automatic transmission powered, the pressure level in the respective shift element is increased until the output torque exceeds a defined limit value.

A disadvantage here is that torque measurement requires expensive measurement equipment and sensors. In addition, such measurement can only occur on a test bench using a transmission that has been removed from the vehicle, which is not service-friendly, and is expensive with respect to the installation effort and costs for an application in the field or service sector.

SUMMARY OF THE INVENTION

The problem addressed by the invention is to specify a method for determining with minimum effort the characteristic values of an automatic transmission, in particular, the fill current value of a frictionally engaging converter lock-up clutch, and with it the compensation data between the converter lock-up clutch and the components that control it. In particular, the method should make it possible to determine the compensation data in the case of exchanging one or both components, without having to remove the automatic transmission from the vehicle.

A method is specified for determining characteristic values of a frictionally engaging converter lock-up clutch of an automatic transmission. The automatic transmission comprises at least one transmission shift element for representing a transmission ratio step. At least one transmission shift element is designed to be frictionally engaging, further transmission shift elements can be designed to be frictionally engaging and/or form-locking. Beyond that, the automatic transmission comprises an output shaft and a hydrodynamic startup element, for instance a torque converter or a hydrodynamic clutch. The hydrodynamic startup element comprises a pump impeller connected in a rotationally fixed manner to a drive motor, and a turbine rotor, where the pump impeller rotates at an engine speed and the turbine rotor rotates at a turbine speed, where a speed ratio that changes with the operating state, exists between the turbine speed and the engine speed. The converter lock-up clutch (WK) is disposed between the pump impeller and the turbine rotor. By means of this clutch, the pump impeller and the turbine rotor can be coupled together either in a rotationally fixed manner or subject to slip depending on the transfer capability of the converter lock-up clutch. The transfer capability of the converter lock-up clutch can be changed by controlling a gearshift device by means of an electrical control current. For the converter lock-up clutch there exists a fill current value of the control current at which the converter lock-up clutch starting from a disengaged state, transitions into a state of torque transfer subject to slip, or at which the converter lock-up clutch transitions from an engaged state into a state of torque transfer subject to slip. Here, using the method according to the invention in a control sequence, with the output shaft stationary, the speed ratio is influenced by a change of the control current. The fill current value is determined from the progression of the speed ratio resulting during the control sequence in conjunction with the progression of the control current. The output shaft of the automatic transmission can be set to stationary, for example, by blocking the drive wheels using a parking brake or another suitable means.

Due to the change of the transfer capability of the frictionally engaging converter lock-up clutch, the turbine speed changes whilst the engine speed is constant during the control sequence. Thus, it would be theoretically possible to determine the fill current value only from the progression of the turbine speed. However, if during the control sequence the engine speed fluctuates, the turbine speed changes as well, even if it is not yet influenced by the change of the transfer capability of the converter lock-up clutch. Thus, capturing only the turbine speed for the purpose of determining the fill current value can lead to erroneous interpretations.

However, if the speed ratio is used as an indicator of the change of the transfer capability of the frictionally engaging shift element, this does not change merely with fluctuations of the engine speed. But with the described test set up during a change of the transfer capability of the frictionally engaging shift element, a deviation results between the engine speed and turbine speed, and therefore also a change in the speed ratio. Thus, erroneous interpretations due to the speed fluctuations are advantageously excluded from the determination of the fill current value. A further advantage of the method according to the invention, is that it is possible to determine the fill current value based on the speed ratio, in a simple measurement setup because only the speed of the engine and turbine need to be captured by measurement in the automatic transmission. The appropriate speed sensors are already disposed in the automatic transmission such that no additional expense for sensors or the installation thereof is required.

However, the control variable does not have to be limited exclusively to the electric control current, but rather in theory can be any physical variable that can influence the transfer capability of a frictionally engaged shift element. In the case of a hydraulically actuated shift element, the control variable can be an electric current that controls an electrohydraulic gearshift device, whereby a pressure is set that influences the transfer capability of the shift element. Another possibility would be a direct measurement of an actuating pressure of the shift element, and with this, the determination of a fill pressure from the progression of the speed ratio over the actuating pressure. Likewise, control of an electromechanical actuator by means of an electric current in order to actuate a frictionally engaging shift element would also be possible. Determining the characteristic values from the progression of the speed ratio calculated from the engine speed and transmission input speed, has the advantage that the speed ratio can be determined by measuring engine speed and transmission input speed of an automatic transmission without requiring the transmission to be removed from the vehicle and operated on a test bench. If the gearshift device or electronic transmission control unit, or both components, are exchanged in the case of damage, this allows new characteristic values to be determined without expensive testing with the transmission removed and placed on a test bench, although the method can also be performed there.

In one embodiment of the method, using at least one frictionally engaging transmission shift element that is disposed between the turbine rotor and a stationary output shaft, the turbine rotor and the output shaft are connected together either in a rotationally fixed manner or subject to slip depending on the transfer capability set at the frictionally engaging shift element.

In this context, in an advantageous embodiment, before the start of the control sequence with a disengaged converter lock-up clutch, the transfer capability of at least one frictionally engaging transmission shift element is adjusted so that the turbine rotor is connected subject to slip to the output shaft, such that a defined starting value of the speed ratio is set for the control sequence.

If the converter lock-up clutch were disengaged, and if no frictional engagement were produced between the turbine rotor and the output shaft due to at least one disengaged transmission shift element, then a speed ratio of slightly less than "1" would be set as the starting value for the control sequence due to the drag losses in the drive train. Because in the control sequence with the converter lock-up clutch engaging, there is a temporal increase in the progression of the speed ratio which is necessary for determining the fill current value, no progression of the speed ratio could be obtained that can be evaluated in the case of slight difference between the starting value and the maximally attainable value of the speed ratio. For this reason, a defined starting value must be set that lies sufficiently below the maximally attainable speed ratio.

In a further embodiment of the method, with the start of the control sequence the control current is steadily changed to steadily increase the transfer capability of the converter lock-up clutch. As a result, the speed ratio increases starting from the defined starting value.

An advantageous embodiment of the method shows that a threshold value between the starting value and a speed ratio of the value "1" is defined as a criterion for determining the fill current value. Here, the value of the control current that is set at the point in time at which in the control sequence the speed ratio corresponds to the threshold value in passing through the same, corresponds to the fill current value to be determined.

The criterion of the threshold value has the advantage that the evaluation is simple because only the measured values at the same point in time must be compared.

In this context, the speed ratio difference between the starting value of the speed ratio and the threshold value is selected to be at least sufficiently large that it is greater than the fluctuations, occurring due to tolerances, of the starting value of the speed ratio that is set constant before the control sequence.

This avoids mistakenly interpreting system-dependent fluctuations of the speed ratio, caused by fluctuations of the measured speed of the drive shaft and transmission input shaft, as a change of the speed ratio as a consequence of the transfer capability of the shift element starting.

Alternatively it is possible that the control current for increasing the transfer capability of the converter lock-up clutch is changed so that the speed ratio is increased starting from a starting value, and the resulting progression is divided into two sections. Here, a first section with a constant progression of the speed ratio at the value of the starting value is described or approximated by a first straight line, and a second section, increasing over time, temporally adjacent to the first section, is described or approximated by a second straight line. An intersection point of the two straight lines is calculated, where the coordinates thereof specify the starting value of the speed ratio and the fill current value to be determined. As a result, the point in time, or the control current value at which the speed ratio changes in the control sequence, can be objectively determined.

In a further embodiment of the method it is possible that during the control sequence the turbine rotor is connected in a rotationally fixed manner to the output shaft by means of the engaged transmission shift elements required for this purpose.

In this context, the control current is changed until the transfer capability of the converter lock-up clutch has increased so far that the engine torque or a corresponding parameter changes. Such a parameter could be, for example, the quantity of fuel injected, which increases with engine loading. Similarly, the engine speed could be used, because it is reduced with loading. As soon as the change of the parameter is significant, the converter lock-up clutch is disengaged again in order to avoid stalling the engine.

It is possible that the control sequence lasts at least until the speed ratio attains a value of "1". Therefore, a progression of the speed ratio of the sufficient length and quantity of measured data is reliably obtained that can be evaluated under all criteria.

In an advantageous alternative, the control sequence is stopped as soon as the data is known for determining the fill current value. This offers the advantage of time-saving in determining the fill current value, particularly for an automatic transmission having multiple frictionally engaging shift elements for each of which an individual fill current value is be determined.

In an advantageous embodiment of the method it is possible to determine the fill current value of the converter lock-up clutch in a vehicle with an installed automatic transmission. As a result, the costly removal of the transmission from the vehicle and setup on the test bench are omitted. Furthermore, the output shaft can be set stationary simply by blocking the drive wheels using a parking brake or another suitable means.

BRIEF DESCRIPTION OF THE DRAWINGS

Exemplary embodiments of the method according to the invention are represented in the figures and are described in more detail in the following.

They show:

FIG. 2 a schematic representation of an automatic transmission with the shift elements to be controlled, FIG. 3 a temporal progression of the transmission values during a control sequence for the converter lock-up clutch, FIG. 4 a progression of the speed ratio versus a control current for a converter lock-up clutch, and FIG. 5 a temporal progression of the transmission values during a control sequence of the converter lock-up clutch for a further variant of the method.

DETAILED DESCRIPTION OF THE PREFERRED EMBODIMENTS

Figure 1:
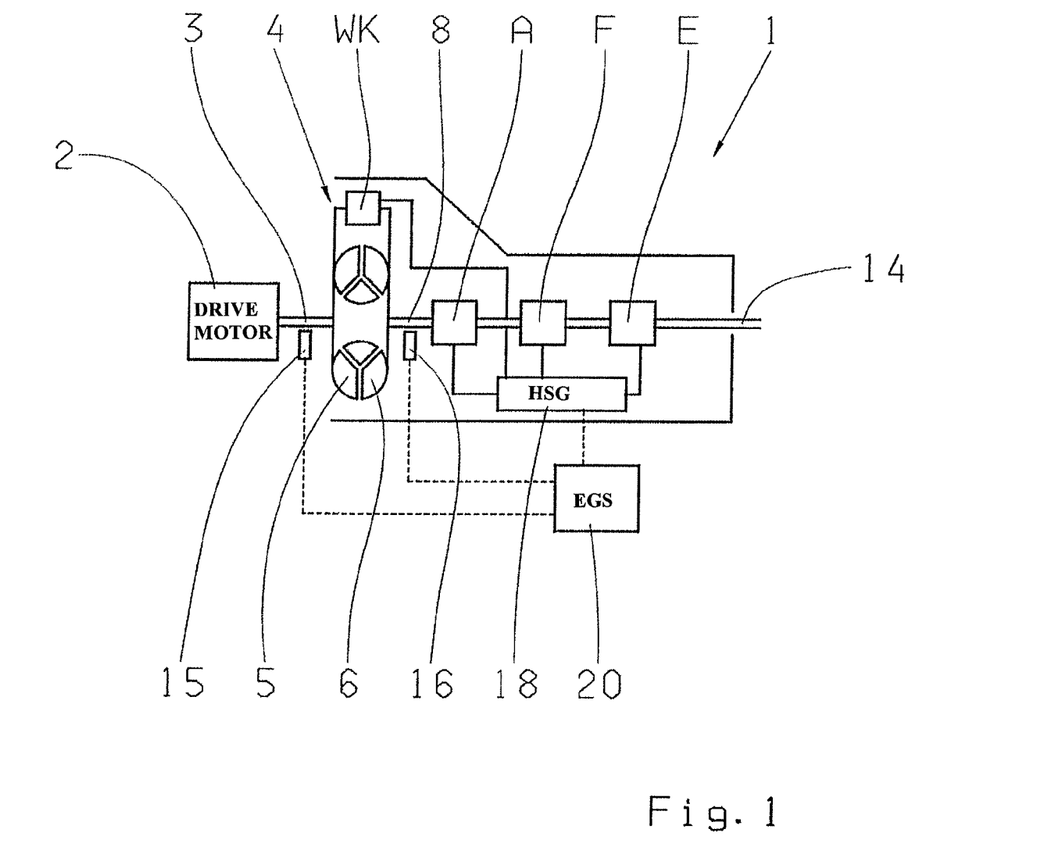
FIG. 1 a schematic representation of an automatic transmission.

FIG. 1 shows an automatic transmission 1 which is driven, via a drive shaft 3, by a drive motor 2, preferably an internal combustion engine. In this case, the drive shaft 3 is connected in a rotationally fixed manner to the drive motor 2 and to a pump impeller 5 of a hydrodynamic torque converter 4. Thus, the speed of the pump impeller 5 equals the engine speed n_M. Using a hydrodynamic momentum exchange, the pump impeller 5 can drive a turbine rotor 6 likewise encompassed by the hydrodynamic torque converter 4. Due to the hydrodynamically effective connection, a speed difference, also designated as slip, develops between the pump impeller 5 or the drive motor 2, and the turbine rotor 6. The value of the slip is described by a speed ratio v which is calculated as a ratio of a turbine speed n_T, which is also the speed of a transmission input shaft 8 connected in a rotationally fixed manner to the turbine rotor 6, and the speed of the pump impeller 5, which corresponds to the engine speed n_M, calculated as (v=n_T/n_M), and cannot exceed a value of v=1. As an alternative to the torque converter 4, preferably implemented as a Trilok converter, a different hydrodynamic drive element, for instance a hydrodynamic clutch, can be disposed between the drive motor 2 and the transmission input shaft. The turbine speed n_T and the engine speed n_M are measured respectively by a speed sensor 15 or 16, and captured in an electronic transmission control unit 20. A converter lock-up clutch WK, which is preferably designed as a frictionally engaging shift element, is disposed between the pump impeller 5 and the turbine rotor 6. If this element is completely engaged due to hydraulic pressure, then the pump impeller 5 and turbine rotor 6 are connected in a rotationally fixed manner and without slip, and the speed ratio v of assumes a value of v=1.

Three shift elements A, F and E, among others, are disposed between the turbine rotor 6 and an output shaft 14. In the present example, both shift elements A and F are designed as claw clutches, but can also be designed as friction clutches. The shift element E is implemented as a frictionally engaging shift element. The turbine rotor 6 can be coupled in a rotationally fixed manner to the output shaft 14 using the shift elements A, F and E of the automatic transmission 1. In the representation shown, all three shift elements A, F and E are to be engaged for creating a frictional connection between the turbine 6 and the output shaft 14, whereby one of several possible transmission ratio steps of the automatic transmission is selected. For a different transmission ratio step, a different combination of shift elements is to be engaged, which however is not represented. Depending on the transmission ratio step, there is a specific transmission ratio between the turbine speed n_T and an output speed n_AB. The hydraulic pressurization with clutch pressure for the shift elements A, F and E for representing the transmission ratio step, as well as for the converter lock-up clutch WK, occurs by means of an oil supply system, of which only a hydraulic control device 18 is shown. This device comprises control and shift valves, not represented, which in turn are switched or pressurized by means of electrical pressure regulators, also not shown. The amount of clutch pressure set by the electrical pressure regulators depends on an electrical control current value with which the electrical pressure regulators, which are preferably designed as electromagnetic control valves, are controlled. An electronic transmission control unit 20 sets the value of the control current that is conducted via an electrical connection, represented by a dotted line, to the electrohydraulic control device 18. The electrohydraulic control device 18 is connected by means of hydraulic connections, represented by solid lines, to both the shift elements for the transmission steps as well as to the converter lock-up clutch WK. Depending on the control of the different electrical pressure regulators, different combinations of shift elements are controlled for representing the different transmission ratio steps. Furthermore, during a shift procedure, i.e., a change of the transmission ratio step, the newly added frictionally engaging shift element(s) are controlled with a pressure that changes over time. The progression of the pressure is influenced by a control current that can be changed over time, wherein the function of the control current over time, preferably an increasing pressure ramp, is stored in the electronic control device. Form-locking shift elements are engaged by a simple activation of the appropriate pressure without a controlled pressure-time function.

After starting the vehicle from a standstill, a converter lock-clutch WK is typically engaged by means of the torque converter 4, in order to connect together in a rotationally fixed manner the pump impeller 5 and the turbine rotor 6. As a result, power transfer subject to slip is avoided in the so-called converter mode, and the efficiency of the drive train increases. The transition from converter mode into the slip-free drive mode should occur without torque impulses to the greatest extent possible, to attain the best driving comfort.

An important variable for guaranteeing a comfortable shift behavior, that is a shift behavior that is free of torsional impulses, is the knowledge of a fill pressure p_WK_F, which is individually determined for each frictionally engaging shift element. The fill pressure p_WK_F is the pressure from which the converter lock-up clutch WK starts to be able to transfer torque, or at which it transitions from a disengaged state into a state of torque transfer subject to slip. The pressure p_WK_F was experimentally determined in the application. It depends on the geometry and the spring characteristics of the respective clutch, and is practically equal for all structurally identical shift elements. If precisely this pressure is set for a gear change, the pressure buildup and thus the torque build up occur steadily and free of torsional impulses, whereby the shift behavior is considered comfortable.

The fill pressure p_WK_F is set by means of a specific fill current value i_EDS_WK_F. A correlation of the fill current i_EDS_WK_F to the fill pressure p_WK_F is found in a table that is stored in the EGS. This correlation was determined on an acceptance test bench during the assembly of the transmission.

In practice, the electrical pressure regulators have tolerances, whereby depending on the electrical pressure regulator, a different clutch pressure p_WK results at the same value of the control current i_EDS_WK. If a defective electronic control device, or a defective electrohydraulic gearshift device, or both components, are now exchanged in the field, or during service in a workshop, and if the originally determined fill current is set, a pressure could now be set in the shift element that does not correspond to the desired value of the fill pressure. As a result, the quality of the shift behavior would be negatively impacted.

The method according to the invention now allows for adapting the components to each other as a learning procedure after an exchange of the components, in that a new fill current value i_EDS_WK_F is determined which generates the correct fill pressure p_WK_F of the converter lock-up clutch WK.

With the method, starting from a defined starting state, a control sequence is started in which by changing the control current i_EDS_WK that controls the respective electrical pressure regulator, the transfer capability of the converter lock-up clutch WK, for which a control current value i_EDS_WK is to be determined, is influenced.

Figure 2:
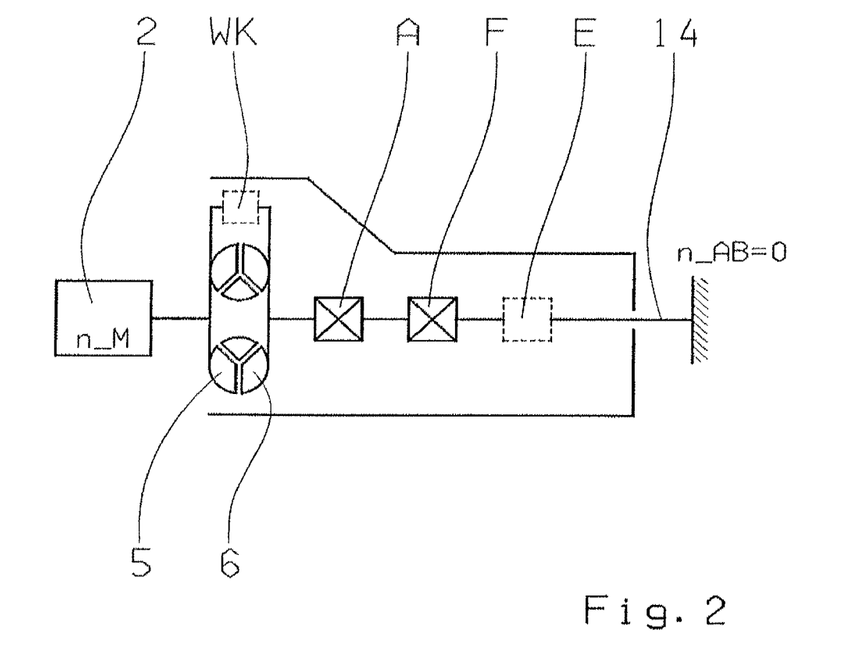

The control sequence for the learning procedure can be started only when the following conditions are simultaneously satisfied:

The vehicle is parked using the parking brake, or the parking lock, such that the output shaft 14 is stationary, as shown in FIG. 2, and as a result, the output speed n_AB=0. The oil temperature and the engine speed n_M must each be within a respectively acceptable range. The form-locking shift elements A and F, which together with the frictionally engaging shift element E represent the respective transmission ratio step, must be engaged. The frictionally engaging shift element E is disengaged. This is shown by the crossed out symbol (engaged shift element) and the solid symbol (disengaged shift element). In the process, the form-locking shift elements are to be engaged using a specific synchronizing function. The converter lock-up clutch WK is disengaged, which is symbolized by the dotted lines.

Alternatively, it is also possible to remove the automatic transmission from the vehicle and install it on a test bench, where the output shaft 14 is kept stationary using suitable means. The advantage of this method, however, is that the fill current value i_EDS_WK_F can be determined in the installed state.

Figure 3:
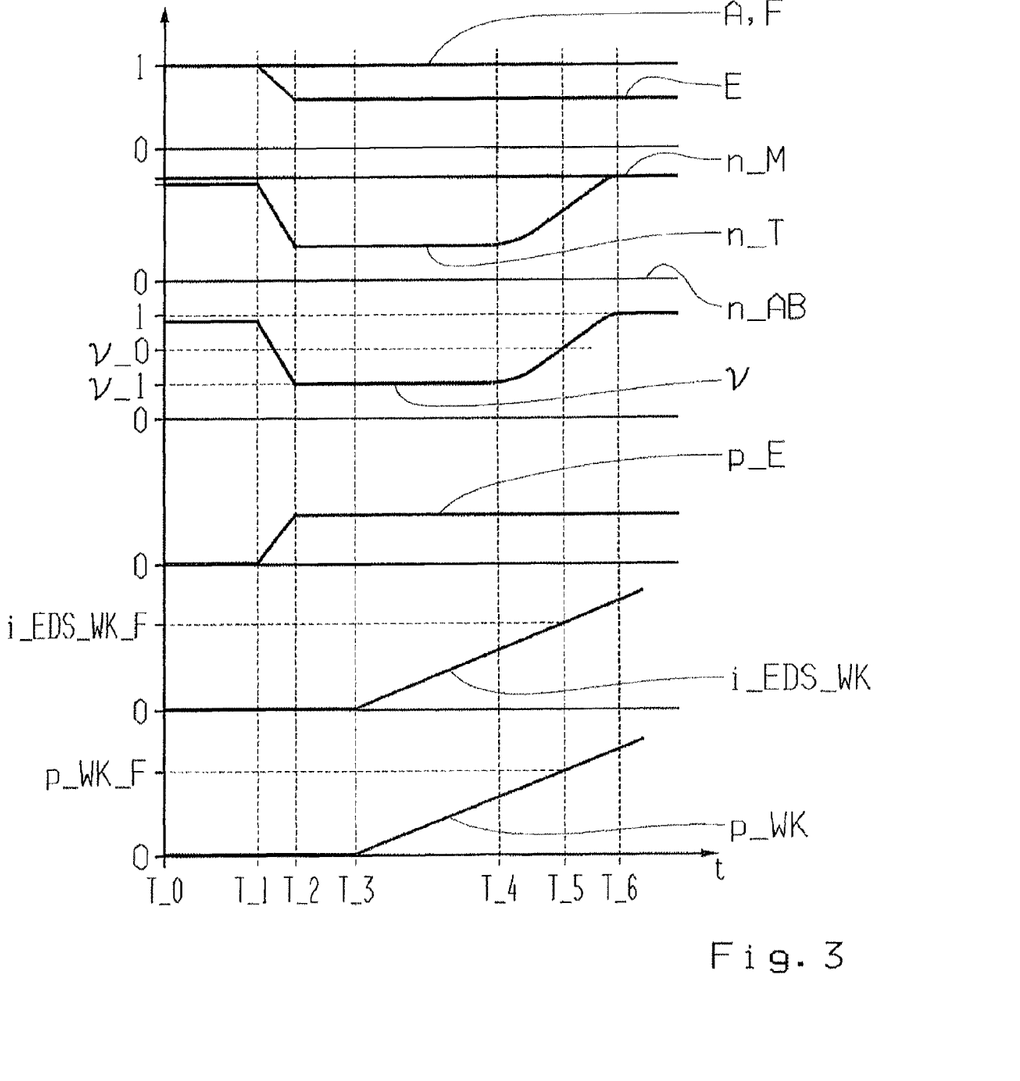

FIG. 3 shows the temporal progressions of the relevant transmission values while performing the method according to the invention, or during the control sequence. Before the start of the control sequence for determining a fill current value i_EDS_WK_F of the converter lock-up clutch, the starting conditions listed in connection with FIG. 2 must be satisfied, with respect to fixing the output shaft 14, and that the oil temperature and the engine speed n_M are in respectively permissible ranges. In addition, both shift elements A and F must be engaged.

The drive motor 2 drives the pump impeller 5, which, if the converter lock-up clutch WK is disengaged, drives the turbine rotor 6 via hydrodynamic momentum exchange. At time T_0, the shift elements A and F are engaged, which is indicated by the shift state "1". The shift elements A, F and E are to be engaged for representing a transmission ratio step. The frictionally engaging shift element E is disengaged, which is represented by a clutch pressure p_E=0. As a result, there is no force-locking connection between the turbine rotor 6 and the blocked output shaft 14. The converter lock-up clutch WK is disengaged, the pressure p_WK of the converter lock-up clutch is the value p_WK=0 bar.

From time T_1, the control sequence is prepared, in that, with the shift clutches A and F engaged, the clutch pressure p_E in the frictionally engaging shift element E that at time T_0 is completely disengaged, is increased so far that at the torque converter 4 a specific speed ratio v is set as the starting value v_1, by which the starting state is determined for this control sequence of the learning procedure. Thus, for example, the transfer capability of the frictionally engaging shift element E is increased by this gradual pressurization thereof to the extent that, as in the example shown, at time T_2, the speed ratio attains the starting value v_1=0.8. The clutch pressure p_E in the frictionally engaging shift element E is held constant after the starting state is attained, whereby the speed ratio v=0.8 also remains constant.

The control sequence starts at time T_3. The control current i_EDS for the converter lock-up clutch WK is increased steadily over time from time T_3, for example in a linearly increasing progression. Thus, the pressure p_WK also increases in the converter lock-up clutch WK.

From time T_4, the clutch disks of the converter lock-up clutch WK abut, and the torque transfer in the converter lock-up clutch WK starts. As a result, the turbine rotor 6 accelerates and the speed difference between the pump impeller 5 and the turbine rotor 6 of the torque converter 4 decreases, whereby the speed ratio v increases from the time T_4, starting from the starting value v_1=0.8.

At time T_5, the speed ratio v reaches a threshold value v_0 of v_0=0.9, for example. In the present example, attaining the threshold value v_0 is the criterion for attaining the fill pressure p_WK_F, so that the value of the control current attained at time T_5 corresponds to the fill current value i_EDS_WK_F. The control current i_EDS is further increased in another progression of the control sequence, up to a time T_6 when a value of the pressure p_WK is attained at which the frictionally engaging converter lock-up clutch WK engages and the pump impeller 5 is connected in a rotationally fixed manner to the turbine rotor 6. Thus, the speed ratio v attains the value v=1.

The first increase of the speed ratio v starting from the starting value v_1, as is the case from time T_4, could in theory serve as a criterion for the start of the transfer capability of the converter lock-up clutch WK. However, it would be possible to erroneously interpret an increase of the speed ratio v, for example due to measurement-related fluctuations of the speed value of the engine speed n_M and/or the turbine speed n_T. For this reason, a threshold value v_0 is defined which lies above possible measurement inaccuracies of the speeds.

In the graph shown, the turbine speed n_T could also be used as a relevant variable for determining the fill current value i_EDS_WK_F of the converter lock-up clutch WK, because the engine speed n_M is constant. In practice however, the control could cause fluctuations of the engine speed n_M which are transferred to the turbine speed n_T, and could be erroneously interpreted as the start of the transfer capability of the converter lock-up clutch WK. In order to avoid this, the speed ratio v is used as the relevant variable for determining the fill current value i_EDS_WK_F, because at the start of the transfer capability of the converter lock-up clutch WK the speed difference between the pump impeller 5 and the turbine rotor 6 changes, and with it the speed ratio v.

The temporal progression of the relevant measured variables are recorded in the electronic transmission control unit and evaluated. Thus, it is possible for the time at which the speed ratio v reaches the threshold value v_0 (in this case time T_5), to determine the value of the control current i_EDS_WK set at this point in time, which is the sought-after fill current value i_EDS_WK_F.

Another possibility is a direct correlation of control current i_EDS_WK and speed ratio v in a graph. Thus, the speed ratio v can be recorded as a function of the control current i_EDS_WK, and can be evaluated as shown in the following (v=f(i_EDS_WK)).

Figure 4:
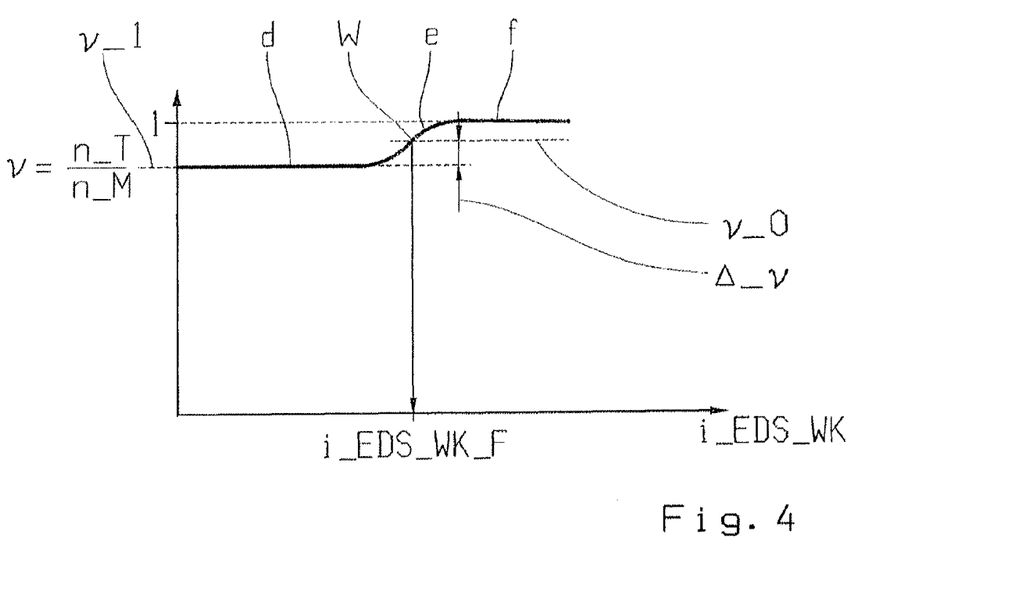

FIG. 4 shows a graph of the progression of the speed ratio v as a function v=f (i_EDS_WK) of the control current i_EDS_WK. The control sequence of the learning procedure of the converter lock-up clutch WK described in FIG. 3 using a graph, is prepared as described in that with shift clutches A and F engaged, the pressure in the frictionally engaging shift element E that at time T_0 is completely disengaged, is increased so far that a specific speed ratio v arises at the torque converter 4, by which the starting value v_1 is determined for this control sequence. Thus, for example, the transfer capability of the frictionally engaging shift element E is increased so far that in a curve section d a starting value of the speed ratio attains a value v_1=0.8. The pressure in the frictionally engaging shift element E, after attaining the starting state, is then held constant, whereby the starting value v_1 of the speed ratio v_1=0.8 also remains constant. Starting from this value, the control current i_EDS_WK for controlling the converter lock-up clutch WK is steadily increased. Before the start of the torque transfer of the converter lock-of the clutch WK, the speed ratio v remains constant despite the increase of the control current i_EDS_WK (curve section d). At the start of the transfer capability of the converter lock-up clutch WK, the speed ratio v increases starting from a specific control current value in a curve section e. When the converter lock-up clutch WK is completely engaged, the speed ratio v attains a value of v=1, which corresponds to a curve section f. Before that, however, the speed ratio exceeds a defined threshold value v_0, wherein starting from v_1=0.8 for example, a threshold value of v_0=0.9 is attained. The coordinates of an intersection point W of the progression of the speed ratio with the threshold value represented as a line parallel to the control current axis i_EDS_WK, yields the sought after fill current value i_EDS_WK_F of the converter lock-up clutch WK.

The steady increase of the pressure in the converter lock-up clutch WK can be stopped at the time when the criterion for determining the fill current i_EDS_WK_F has been attained, namely attaining the threshold value v_0. Thus, the necessary time for the learning procedure can be advantageously limited to a minimum.

This threshold value v_0 is given, for example, in percent of the starting value of a maximum speed ratio v_1. Alternatively, a speed ratio difference Δv between the starting value v_1 and the threshold value v_0 can be specified, which is calculated as Δ_v=|v_0−v_1|. This speed ratio difference is selected to be large enough so that already minor measurement-related fluctuations of the speed ratio are not erroneously interpreted as a complete filling of the converter lock-up clutch WK, and therefore are not interpreted as the start of the transfer capability thereof.

Alternatively, the method can also be applied to determine the fill current value i_EDS_WK_F of a converter lock-up clutch WK, which is engaged pressureless, or in which the force required for engaging is not applied hydraulically but rather mechanically by means of a spring for example.

Figure 5:
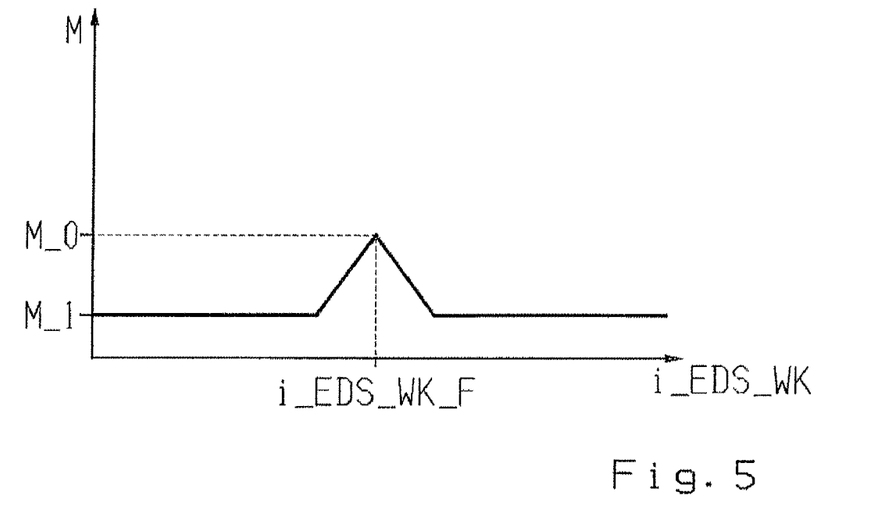

FIG. 5 shows an alternative embodiment of the method. Here, the progression of the speed ratio v does not serve as an indicator for attaining the fill current value i_EDS_WK, but rather the progression of an engine torque M.

Before the control sequence is performed, specific conditions must be satisfied, similarly to the method described in conjunction with FIGS. 3 and 4. The engine speed n_M and the oil temperature of the transmission must be located in a permissible range; at specific values, the form-locking shift elements A and F are engaged using a specific synchronizing function. The frictionally engaging shift element E is also engaged, whereby a gear level is selected, in this case the fourth gear. The converter lock-up clutch WK is disengaged. Because the frictional connection in the transmission is produced by selecting the fourth gear, the turbine rotor 5 is connected in a rotationally fixed manner to the stationary output shaft 14, so that the speed ratio v takes on a starting value of v_1=0.

Starting from these operating conditions at a time T_1, the control sequence begins. The control current i_EDS_WK for the converter lock-up clutch WK is increased steadily, whereby the converter lock-up clutch pressure p_WK also increases. From a specific control current value i_EDS_WK, the converter lock-up clutch WK transitions from a disengaged state into a state of torque transfer subject to slip, which is shown by a jump of the engine torque M and/or a drop in the engine sped n_M. The value of the control current i_EDS_WK that is set at the time of the reaction of the measured variables of the engine—here time T_2—is the sought after fill current value i_EDS_WK of the converter lock-up clutch WK. The increase in the quantity of fuel injected, for example, which can be obtained from an electronic engine control unit, also serves as an indication for the engine torque M. In order to avoid stalling, due to braking the engine 2, the ramp-shaped temporal progression of the control current i_EDS_WK is reversed from an increasing progression to a decreasing progression, whereby the converter lock-up clutch WK is disengaged again. The determined fill current value i_EDS_WK_F is stored.

The advantage of this embodiment of the method is that software processes for normal operation, for instance, selecting the fourth gear by engaging the shift elements A, F and E, can be used.

It is generally true for all variants of the method that after the fill currents i_EDS_WK_F, or i_EKS_WK_F are determined, they are assigned to the fill pressure p_WK_F known from the application for the respective shift element, or with the knowledge of the fill current, a polynomial is defined, as shown in the following.

The polynomial is a third degree polynomial, for example, with which the current i_EDS_WK can be calculated as a function of the converter lock-up clutch pressure p_WK. Four coefficients a_0, a_1, a_2 and a_3 must be known for defining the polynomial, as shown in equation A:

$$i\_EDS\_WK = a\_0 * p\_WK^3 + a\_1 * p\_WK^2 + a\_2 * p\_WK + a\_3 \quad (A)$$

The coefficients a_0, a_1 and a_2 are known.

With the knowledge of the fill current value i_EDS_WK_F, determined using the method according to the invention, or with the known correlation of the fill current i_EDS_WK_F to the fill pressure p_WK_F it is possible to calculate the coefficient a_3. This is substituted into the polynomial, resulting in equation B:

$$i\_EDS\_WK\_F = a\_0 * p\_WK\_F^3 + a\_1 * p\_WK\_F^2 + a\_2 * p\_WK\_F + a\_3 \quad (B)$$

The fill current i_EDS_WK_F, the fill pressure p_WK_F, and the coefficients a_0 to a_2 are known, so that the equation can be solved for the coefficient a_3. The coefficient a_3 is placed into the equation A, which results in a polynomial from which the current value required for setting a specific clutch pressure can be determined.

REFERENCE CHARACTERS 1 automatic transmission
2 drive motor
3 drive shaft
4 hydrodynamic torque converter
5 pump impeller
6 turbine rotor
8 transmission input shaft
14 output shaft
15 speed sensor n_M
16 speed sensor n_T
18 electrohydraulic gearshift device (HSG)
20 electronic transmission control unit (EGS)
A shift element
F shift element
E frictionally engaging shift element
WK converter lock-up clutch
d section
e section
f section
i_EDS_WK control current
i_EDS_WK_F converter lock-up clutch fill current
M engine torque
n_AB output speed
n_M engine speed
n_T turbine speed
p_E clutch pressure of shift element E
p_WK converter lock-up clutch pressure
p_WK_F fill pressure
W intersection point
Δ_v speed ratio difference Δ_v=|v_0−v_1|
v speed ratio n_T/n_M
v_0 speed ratio starting value
v_1 speed ratio threshold value
v=f (i_EDS_WK) progression of the speed ratio over the control current

The invention claimed is:

1. A method of determining characteristic values (i_EDS_WK_F) of a frictionally engaging converter lock-up clutch (WK) of an automatic transmission (1), the automatic transmission comprises an output shaft (14), a hydrodynamic startup element (4), the converter lock-up clutch (WK) and at least one transmission shift element (A, F, E), the hydrodynamic startup element (4) comprises a turbine rotor (6) and a pump impeller (5), the pump impeller is connected, in a rotationally fixed manner, to a drive motor (2), such that the pump impeller (5) rotates at an engine speed (n_M), and the turbine rotor (6) rotates at a turbine speed (n_T), a speed ratio (v=n_T/n_M) is defined as a ratio of the turbine speed to the engine speed, the speed ratio is changeable based on an operating state existing between the turbine speed (n_T) and the engine speed (n_M), the converter lock-up clutch (WK) is disposed between the pump impeller (5) and the turbine rotor (6), the pump impeller (5) and the turbine rotor (6) are connectable, via the converter lock-up clutch (WK), either in a rotationally fixed manner or subject to slip depending on a transfer capability of the converter lock-up clutch (7), the transfer capability of the converter lock-up clutch (WK) being changeable by controlling a gearshift device (18) with an electrical control current (i_EDS_WK), for the converter lock-up clutch (WK), a fill current value (i_EDS_WK_F) existing at which the converter lock-up clutch (WK) starting from a disengaged state transitions into a state of torque transfer subject to slip, the method comprising the steps of:

initiating a control sequence, with an electronic transmission control unit, when the output shaft (14) is stationary;
 continuously increasing the electrical control current, with the electronic transmission control unit, to change the speed ratio (v) of the turbine speed to the engine speed in the control sequence; and
 determining, with the electronic transmission control unit, the fill current value (i_EDS_WK_F) from a progression of the speed ratio (v) of the turbine speed to the engine speed during the control sequence in conjunction with a progression of the electrical control current (i_EDS_WK).

2. The method according to claim 1, further comprising the step of connecting, via the at least one transmission shift element, the turbine rotor (6) and the output shaft (14) together in either a rotationally fixed manner or subject to slip, depending on a transfer capability set at the at least one frictionally engaging transmission shift element (E), the at least one transmission shift element (E) is frictionally engagable and disposed between the turbine rotor (6) and the stationary output shaft (14).

3. The method according to claim 2, further comprising the step of setting, with the electronic transmission control unit, the transfer capability of the at least one frictionally engaging transmission shift element (E), before initiating the control sequence and with the converter lock-up clutch (WK) disengaged, such that the turbine rotor (6) is connected to the output shaft (14) subject to slip so that a defined starting value (v_1) of the speed ratio is set for the control sequence.

4. The method according to claim 2, further comprising the step of, during the control sequence, engaging the at least on transmission shift element to connect the turbine rotor (6), in a rotationally fixed manner, to the output shaft (14).

5. The method according to claim 4, further comprising the step of changing the control current (i_EDS_WK), with the electronic transmission control unit, until the transfer capability of the converter lock-up clutch (WK) increases so that either the engine torque (M) or a parameter corresponding to the engine torque changes.

6. The method according to claim 3, further comprising the step of, at the start of the control sequence, steadily increasing the control current (i_EDS_WK), with the electronic transmission control unit, to steadily increase the transfer capability of the converter lock-up clutch (WK) so that the speed ratio (v) increases starting from the defined starting value (v_1).

7. The method according to claim 6, further comprising the step of defining, with the electronic transmission control unit, the speed ratio as having a value of 1, and defining a threshold value (v_0), as being between the defined starting value (v_1) and the speed ratio (v), as a criterion for determining the fill current value (i_EDS_WK_F), a value of the control current (i_EDS_WK), which is set at a point in time in the control sequence at which the speed ratio (v) corresponds to the threshold value (v_0) passing through the same, corresponds to the fill current value (i_EDS_WK_F) to be determined.

8. The method according to claim 7, further comprising the step of defining, with the electronic transmission control unit a speed ratio difference (Δv), between the starting value (v_1) of the speed ratio (v) and the threshold value (v_0), such that the speed ratio difference (Δv) is greater than tolerance-dependent fluctuations of the starting value (v_1) of the speed ratio (v) set as a constant before initiating the control sequence.

9. The method according to claim 7, further comprising the step of continuing the control sequence at least until the speed ratio (v) attains a value of "1".

10. The method according to claim 7, further comprising the step of stopping the control sequence as soon as data for determining the fill current value (i_EDS_WK_F) is known.

11. The method according to claim 1, further comprising the step of changing, with the electronic transmission control unit, the electrical control current (i_EDS_WK), to increase the transfer capability of the converter lock-up clutch (WK), so that the speed ratio (v) increase from a starting value (v_1), and dividing a resulting progression of the speed ratio into first and second progression sections, such that the first progression section is a constant progression of the speed ratio at a value of the starting value (v_1) and is either approximated or described by a first straight line, and the second progression section, temporally adjacent to the first progression section, increases is either described or approximated by a second straight line, and an intersection point of the first and the second straight lines is calculated and coordinates thereof specify the starting value (v_1) of the speed ratio (v) and the fill current value (i_EDS_WK_F) to be determined.

12. The method according to claim 1, further comprising the step of determining the fill current value (i_EDS_WK_F) of the converter lock-up clutch (WK) on an automatic transmission installed in a vehicle.

13. A method of determining a fill current value of a frictionally engagable converter lock-up clutch in an automatic transmission of a motor vehicle and controlling a torque transfer capability of the converter lock-up clutch, the motor vehicle having a drive engine that is connected, via a drive shaft, to a pump impeller of a hydrodynamic startup element in a rotationally fixed manner such that the pump impeller rotates at an engine speed, a turbine rotor of the hydrodynamic startup element which rotates at a turbine speed is rotationally fixed to a transmission input shaft, a converter lock-up clutch is disposed between the pump impeller and the turbine rotor and is controllable between a fully engaged state, in which a speed ratio of the turbine speed to the engine speed is at least substantially equal to 1, and a fully disengaged state in which the converter lock-up clutch transmits no rotation between the pump impeller and the turbine rotor, the method comprising:

restricting rotation of an output shaft of the automatic transmission;

changing the torque transfer capability of the converter lock-up clutch by controlling a gearshift device with an electrical control current that is transmitted by an electronic transmission control device;

influencing the speed ratio by steadily increasing the electrical control current with the electronic transmission control device;

recording, in the electronic transmission control device, variations of the speed ratio in relation to changes of the electrical control current; and determining the fill current value as a value of the electrical control current transmitted to the gearshift device at which the converter lock-up clutch transitions from the fully disengaged state to an initial slip state at which the converter lock-up clutch begins transmitting torque between the pump impeller and the turbine rotor.

* * * * *